May 22, 1962     R. W. JOHNSTON     3,035,854
VEHICLE HAVING CRANK SHAFT OPERABLE BY STANDING OCCUPANT
Filed July 29, 1960
2 Sheets-Sheet 1
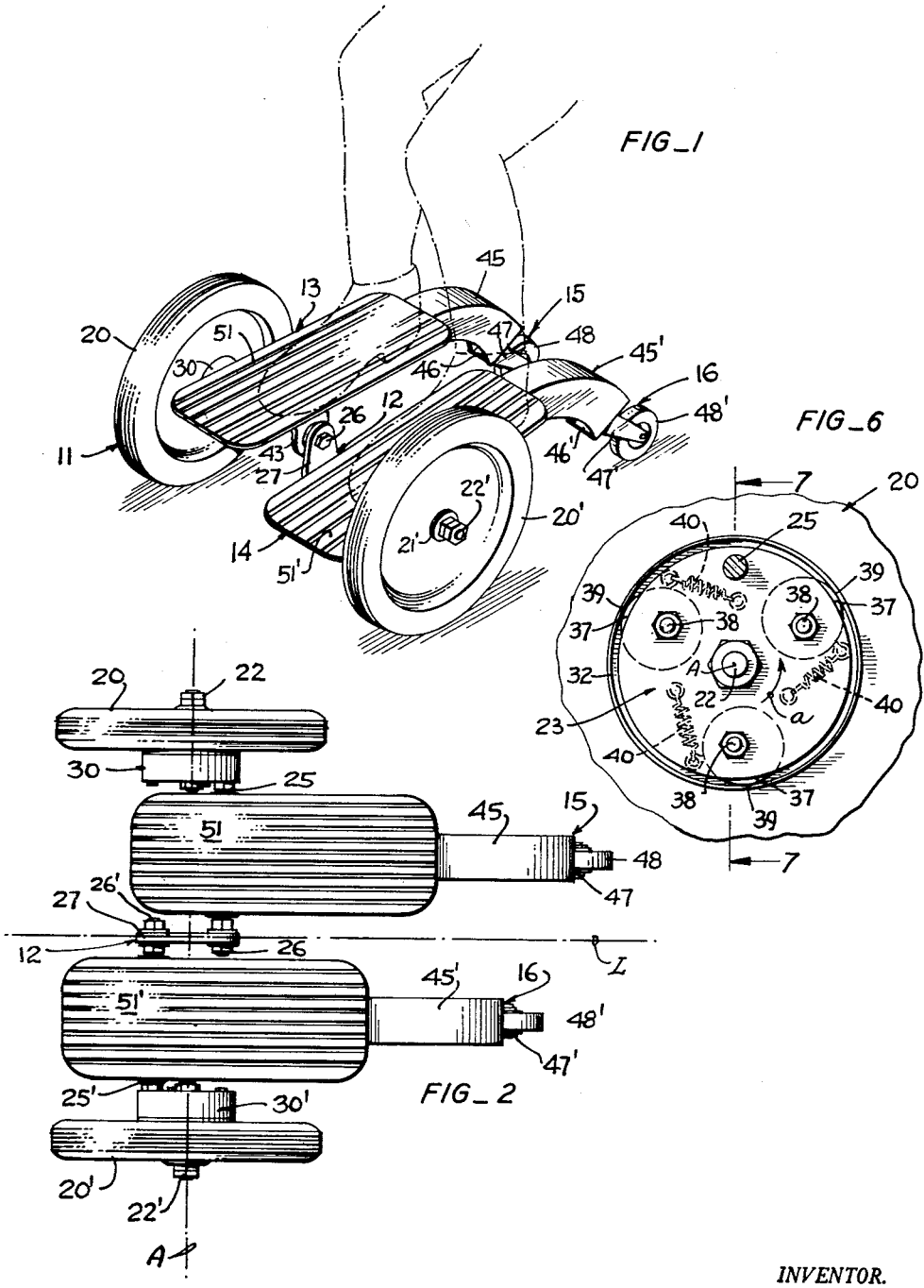
INVENTOR.
ROBERT W. JOHNSTON
BY
Hansen and Lane
HIS ATTORNEYS

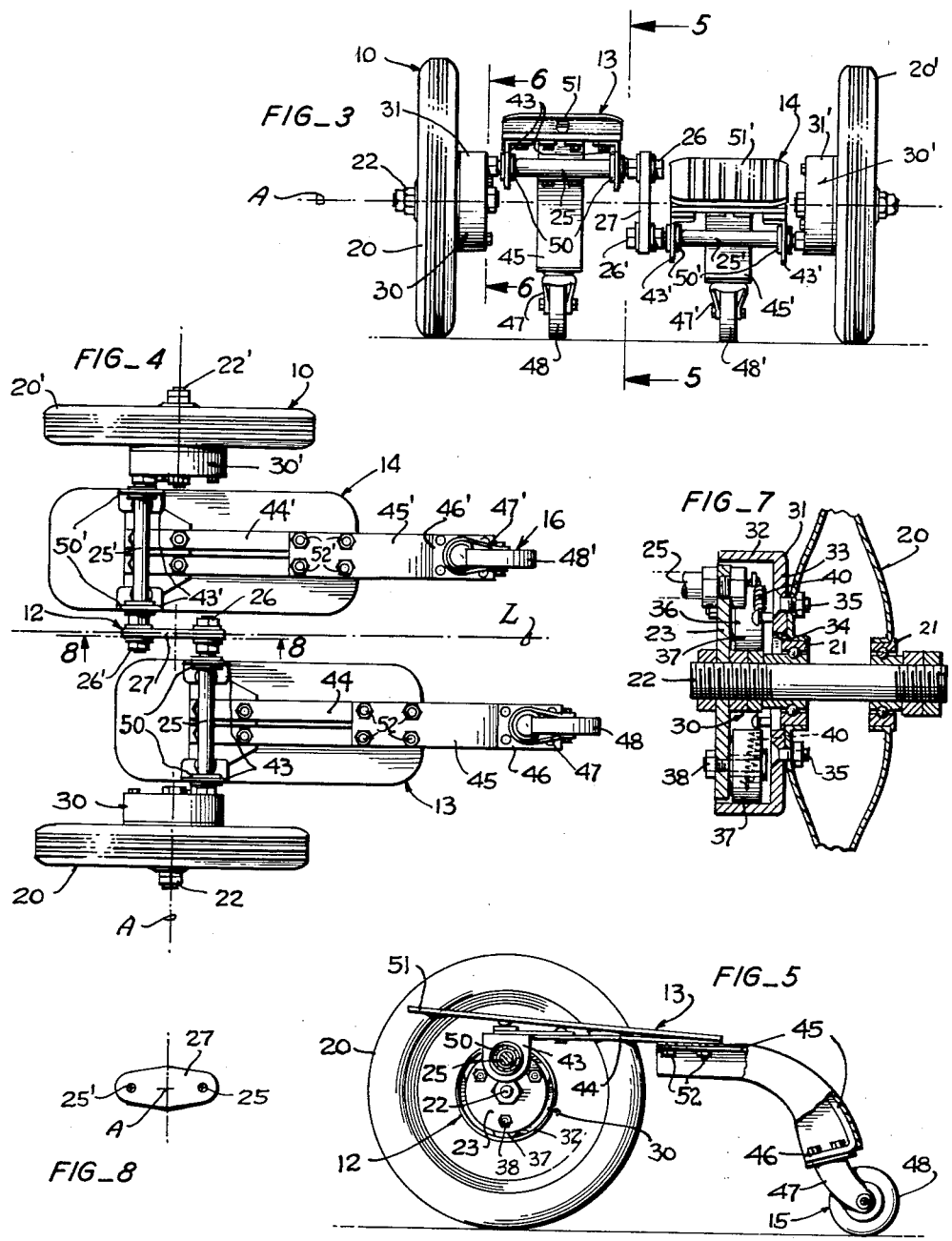

United States Patent Office 3,035,854
Patented May 22, 1962

3,035,854
VEHICLE HAVING CRANK SHAFT OPERABLE BY STANDING OCCUPANT
Robert W. Johnston, 15149 Cooper Ave., San Jose 24, Calif.
Filed July 29, 1960, Ser. No. 46,307
10 Claims. (Cl. 280—221)

This invention relates to foot propelled vehicles and more particularly to a new and novel type of velocipede hereinafter referred to as a walkomobile.

The closest thing to the device of the present invention would be the well known roller skates in that the rider is supported solely by the walkomobile without benefit of hand holds or handles. In roller skating a person must practice considerably in order to acquire skill and agility. So it is with the walkomobile on which the person both propels and directs the same by the use of his feet and legs and the shifting of his weight thereon or by leaning to one or the other side to change course.

It is one object of this invention to provide a walkomobile upon which a person can freely stand and propel the same by a pedal action.

Another object is to provide a walkomobile affording pedal action while supporting the rider and affording steerability by the shifting of the rider's weight upon the pedals.

It is another object to provide a pair of pedal platforms connected to a wheel supported crank shaft and having castered trailing portions.

These and other objects and advantages of the present invention will become more apparent from a reading of the following description in the light of the accompanying drawings in which:

FIG. 1 is a perspective view of my new walkomobile.
FIG. 2 is a top plan view of the same.
FIG. 3 is a front elevational view of the same with parts thereof in a different position for illustration.
FIG. 4 is a bottom plan view of my new walkomobile.
FIG. 5 is a section through FIG. 3 taken substantially along line 5—5 thereof.
FIG. 6 is a section through FIG. 3 taken substantially along line 6—6 thereof and at slightly larger scale.
FIG. 7 is a section through FIG. 6 taken along line 7—7 thereof.
FIG. 8 is a section through the mid cross arm taken along line 8—8 in FIG. 4.

The walkomobile embodying the present invention, generally designated 10, comprises a wheeled fore gear 11 including a crank shaft arrangement 12 having bearing connection with pedals 13 and 14 each of which has a tail wheel 15 and 16 respectively.

Each half of the walkomobile 10 is identical on opposite sides (left and right) of a longitudinal center line L as seen in FIGS. 2 and 4 and accordingly like parts will be identified by like reference numerals those on the left having prime exponents.

The wheeled fore carriage or gear 11 includes wheels 20 and 20' each having a ball bearing hub 21—21' journaled for rotation on a stud shaft or axle 22—22', respectively (FIG. 7). The stud axle 22—22' is secured to and/or formed as a part of a disc 23—23' and extends concentrically thereof as best seen in FIG. 6.

The wheels 20 and 20' as well as their respective axle shafts 22—22' and the mounting discs 23—23' therefore are concentrically arranged on axis A which is transverse to the longitudinal axis L (FIGS. 2 and 4).

Each of the discs 23 and 23' consists of a crank arm forming a part of the crank shaft arrangement 12, hereinbefore referred to, in that each disc 23—23' has a crank shaft 25—25', respectively, secured thereto and eccentrically with respect thereto. The inner end 26—26' of each crank shaft 25 and 25' is secured to the respective opposite ends of a medial crank arm 27 which is common to both left and right sides of the device 10 and disposed to rotate about axis A in a plane congruent to the longitudinal axis L. This places the ends 26—26' of the crank shafts 25—25' diametrically opposite each other and correspondingly renders the crank shafts 25 and 25' radially and oppositely offset relative to the axis A of the crank shaft arrangement 11 (FIG. 8).

The wheels 20—20' being freely rotatable on their respective axle shafts 22 and 22' are normally rollable upon a surface independently of whether the crank shaft is rotated. In other words, they are free wheeling relative to the drive shaft except when drivingly related thereto through the medium of a clutch or one way drive 30—30' now to be explained. Each wheel 29—20' has a drum 31—31' secured thereto concentrically of its hub. As best seen in FIG. 7 the drum 31 has a cylindrical portion 32 formed integrally with a disc end 33 provided with an opening 34 at its center through which the axle shaft 22 extends. The disc end 33 is secured by any well known means such as bolts 35, welding or the like to the hub of the wheel 20 so as to turn therewith about the axle upon which it is journaled.

The disc 23 hereinbefore mentioned is preferably dimensioned to fit with clearance within the cylindrical portion 32 of the drum in spaced relation to the disc end 33 of the latter to provide a chamber 36 within the drum. Within this chamber 36 is one or more clutch elements 37, three being shown in the present instance (FIG. 6). Each clutch element 37 consists of a piece of round stock eccentrically and pivotally mounted on a stud pin 38 extending from and mounted on the disc 23 which is driven directly by the crank shaft 11 so as to rotate in unison therewith.

The stud pins 38 are disposed at 120° positions around the axis (A) of the disc 23. The distance of the pin 38 radially from the axis of the disc 23 plus the greatest distance eccentrically from the periphery 39 of the element 37 is greater than the internal radius of the cylindrical portion 32 of the drum 31. Each of the elements 37 is urged by a spring 40 toward the cylindrical portion 32 of the drum so that the peripheries of the elements have sliding contact with the drum.

The spring 40 is interconnected between the disc 23 and the respective element 37 so that when the crank shaft arrangement 11 is turned forwardly over center (axis A) in the direction of arrow *a* (anti-clockwise FIG. 6) the peripheries 39 of the elements 37 bindingly engage the cylindrical portion 32 of the drums 31—31'. This drives the drums is unison with the crank shaft 12 so as to drive the wheels 20—20' unidirectionally therewith. However, if the crank shaft ceases turning as aforesaid, there is slippage between the elements 37 and the drum so as to achieve a coasting or free wheeling action between the crank shaft 12 and the wheels 20—20'.

Referring now to FIGS. 3, 4 and 5 in the drawing each pedal 13 and 14 is shown as having bearing connection with the crank shaft arrangement 12. The pedal 13 is pivotally connected to the right side portion 25 of the crank shaft and the pedal 14 is pivotally connected to the left side portion 25' of the crank shaft. The pedals 13 and 14 are otherwise identical and like reference numerals apply to each with primed numerals used on the pedal 14 so that all parts on either side of longitudinal axis L will be consistently identifiable by like numerals.

Each pedal 13—14 includes a trunnion portion 43—43' having two downturned ears formed integrally with or secured to a spring steel arm 44—44' having its opposite end secured to the tail wheel section 15 and 16, respectively.

Each tail wheel section 15 and 16 includes a rigid elbow-like portion 45—45', respectively, which is downturned at its trailing end to terminate in a flange 46—46' having a caster wheel unit 47—47' secured thereto so that the wheel 48—48' thereof will follow a trailing course relative to the direction of movement of the walkomobile 10. In this regard the swivel pin (not shown) of the caster wheel unit is set perpendicular to the trailing flange 46—46' at a forwardly tending angle. I have found an angular disposition of 15° to vertical to be most practical in attaining self alignment of the caster wheel parallel to the longitudinal axis of the walkomobile.

For best results I prefer to employ ball bearing units 50—50' on each of the downturned ears of the trunnions 43—43' to afford ease of operation thereof relative to the crank shaft portion 25—25' with which they are operatively associated.

Each pedal 13 and 14 further includes a platform 51—51' of a size to accommodate the foot of a person. This platform 51—51' has its aft end secured by bolts 52—52' to the forwardly extending portion of the elbow 45—45' on the tail wheel section 15—16, respectively. As best seen in FIG. 5 the platform 51—51' extends springboard fashion forwardly over the crank shaft portion 25—25' of which it is a part and so disposed that the ball of the rider's foot overlies the crank shaft portions. At this point the platform rests upon a round headed bolt extending upwardly from the trunnion portion 43—43' to afford rockability of the platform relative thereto with a corresponding torque action on the elbow portion 45—45' tending to tilt the latter to one or the other side to achieve steerability of the wheels, especially the caster wheels 48—48' on the tail wheel sections 15 and 16.

Having thus described the construction of my new walkomobile the following is an explanation of the function and operation of the device embodying the present invention.

The rider stands upon the walkomobile with his feet resting flat upon the platform 51—51'. The rider is now supported entirely by the walkomobile, his full weight being wholly upon the wheeled vehicle and his hands entirely free as in the case of roller skating. As seen in FIG. 1 the crank shaft 25 on the right side is high so that a slight forward thrust by the right foot of the rider will start the crank action whereupon as the rider presses down upon each pedal alternately with the right and left foot to rotate the crank shaft 12. This rotates the crank arm discs 23—23' and with them the clutch elements 37—37' which being eccentrically mounted bindingly engage the cylindrical portion 32 of the drums 31—31' to turn the wheels 20—20' in a forward direction. In this manner the rider achieves a straight forward ride upon the walkomobile. Since the clutch elements 37—37' are so arranged as to achieve forward rotation of the wheels 20—20' it will be obvious that when the rider stops pumping the pedals the forward rotation of the wheels continues. In other words, with the pedals still as the walkomobile is going forward a coasting action results due to the slippage between the clutch elements 37 and the drums 31—31'.

Causing the walkomobile to turn to the right or left requires a shifting of his weight by the rider. This puts a torque stress on the spring steel arms 44—44' to tilt the elbow-like tail portions 45—45' thus changing the angular disposition of the swivel of the casters so that the wheels thereof take a change of course tending in directing the walkomobile away from that side where the rider has shifted his weight. For turning sharp corners the rider may tilt his feet sharply upon the platforms causing the caster wheels 48—48' to assume an angle approximately 45° from the longitudinal axis L. In this instance the wheel 20 on that side of the walkomobile toward which the rider has tilted his weight slows down somewhat and acts as a fulcrum while the opposite wheel 20' takes an arcuate path across the otherwise normal forward direction or course of travel.

After considerable practice very much like that required in roller skating and/or bicycle riding, the rider develops a skill and technique by which he has full control over the course of travel and speed of the walkomobile. In this connection it should be noted that the flexibility of the spring arms and relative disposition of the platforms thereto and directly above the crank shaft arrangement has a great deal to do with the torques and stresses applied by the feet of the rider. It will be appreciated that the walkomobile can be made operable in the reverse direction by reversing the clutch elements and the spring action thereon. In this case, the caster wheels become the leading wheels and the rider would face them when standing on the platforms.

While I have explained my new walkomobile in specific detail, it will be appreciated by those skilled in the art that it is susceptible to alteration, variation and/or modification without departing from the spirit of my invention. I therefore desire to avail myself of all variations, alterations and/or modifications as fairly come within the purview of the appended claims.

What I claim as new and desire to protect by Letters Patent is:

1. A walkomobile comprising a two wheeled fore gear including a pair of crank shafts joined diametrically of each other at a medial crank arm, a pedal journaled to each of said crank shafts, each said pedal comprising a leaf spring arm, a downturned elbow-like trailing arm secured to each said leaf spring, a caster wheel on the terminal end of each of said trailing arms, and a foot supporting platform secured to each of said trailing arms in overlying relation to said crank shaft.

2. A walkomobile comprising a fore gear comprising a pair of crank shafts joined diametrically of each other at a medial crank arm, a disk-like crank arm at the outer end of each said crank shaft having an axle shaft extending outwardly therefrom co-axially of the axis about which said crank shafts swing, a wheel mounted for rotation on each of said axle shafts, a pedal journaled to each of said crank shafts, each said pedal comprising a leaf spring arm, a downturned elbow-like trailing arm secured to said leaf spring, a caster wheel on the terminal end of said trailing arm, a foot supporting platform secured to said trailing arm and overlying said crank shaft, and a clutch means between each of said wheels and said disc-like crank arms for drivingly connecting said wheels to said crank shafts.

3. A walkomobile comprising a fore gear including a pair of crank shafts joined diametrically of each other at a medial crank arm, a pedal journaled to each of said crank shafts, each said pedal comprising a leaf spring arm, a downturned elbow-like trailing arm secured to said leaf spring, a caster wheel on the terminal end of said trailing arm and a foot supporting platform secured to said trailing arm and overlying said crank shaft, a disc-like crank arm at the outer end of each said crank shaft having an axle shaft extending outwardly therefrom co-axially of the axis of swing of said crank shafts, a wheel having a ball bearing hub mounted for free rotation on each of said axle shafts, a cluch drum mounted on the inner side of each said wheel concentric of said axle shaft in spaced relation to the disc-like crank arm adjacent the same, a clutch element eccentrically mounted on each said disc-like crank arm, and means for urging said clutch element toward said clutch drum upon rotation of said crank shafts in one direction for drivingly connecting the latter to said wheels and affording continued rotation of said wheels when said crank arms and pedals are at rest.

4. A walkomobile comprising a wheeled fore gear including a pair of crank shafts, a pair of pedals journaled to said crank shafts, a tail wheel on each said pedal for rollably supporting the aft end thereof, a disc-like crank arm at the outer end of each said crank shaft having an axle shaft extending outwardly therefrom co-axially of the axis of swing of said crank shafts, a wheel having a ball bearing hub mounted for free rotation on each of said axle shafts, a clutch drum mounted on the inner side of each said wheel concentric of said axle shaft in spaced relation to the disc-like crank arm adjacent the same, a plurality of clutch elements eccentrically mounted on each said disc-like crank arm, and means for urging said clutch elements toward said clutch drum upon rotation of said crank shafts in one direction for drivingly connecting the latter to said wheels and affording continued rotation of said wheels when said crank arms and pedals are at rest.

5. A walkomobile comprising a fore gear including a pair of crank shafts, a pedal journaled to each of said crank shafts, a tail section on each said pedal having a caster wheel on its trailing end for rollably supporting the aft end thereof, a disc-like crank arm at the outer end of each said crank shaft having an axle shaft extending outwardly therefrom co-axially of the axis of swing of said crank shafts, a wheel having a ball bearing hub mounted for free rotation on each of said axle shafts, a clutch drum mounted concentrically on the inner said of each said wheel in spaced relation to the disc-like crank arm adjacent the same, a plurality of clutch elements eccentrically mounted on each said disc-like crank arm, and means for urging said clutch elements toward said clutch drum upon rotation of said crank shafts in one direction for drivingly connecting the latter to said wheels and affording continued rotation of said wheels when said crank arms and pedals are at rest.

6. A walkomobile comprising a fore gear including a crank shaft arrangement comprising a pair of crank shafts joined diametrically of each other to medial crank arm, a disc-like crank arm secured to the outer end of each said crank shaft having an axle shaft extending outwardly therefrom co-axially of the axis of swing of said crank shafts, a wheel mounted on each said axle shaft, a one way clutch means between each said wheel and the disc-like crank arm adjacent thereto for drivingly connecting said wheels to said crank shaft arrangement, a pedal drivingly connected to each of said crank shafts and each comprising a bearinged trunnion journaled on its respective crank shaft, a leaf spring arm extending rearwardly from said trunnion and terminating in a downwardly extending trailing portion, and a caster wheel swivelly mounted on each said trailing portion affording steerability of said walkomobile when the rider of the latter applies torsioning pressure to said pedals for twisting said leaf spring arms to tilt the trailing portions thereof.

7. A walkomobile comprising a crank shaft arrangement having a pair of crank shafts joined diametrically of each other to a medial crank arm, a disc-like crank arm secured to the outer end of each said crank shaft having an axle shaft extending outwardly therefrom co-axially of the axis of swing of said crank shafts, a wheel mounted on each said axle shaft, a one way clutch means between each said wheel and the disc-like crank arm adjacent thereto for drivingly connecting said wheels to said crank shaft arrangement, comprising a drum mounted concentrically of and on the inner side of said wheel in spaced relation to the disc-like crank arm adjacent the latter and a plurality of clutch elements eccentrically mounted on each said disc-like crank arm and normally biased toward said drum for bindingly engaging the same when said crank shaft is turned in a forward direction for driving said wheels unidirectionally therewith, a pedal drivingly connected to each of said crank shafts, each said pedal comprising a bearinged trunnion journaled on its respective crank shaft, a leaf spring arm extending rearwardly from said trunnion and terminating in a downwardly extending trailing portion, and a caster wheel swivelly mounted on each said trailing portion affording steerability of said walkomobile when the rider of the latter applies torsioning pressure to said pedals for twisting said leaf spring arms to tilt the trailing portions thereof.

8. A walkomobile comprising a fore gear including a crank shaft arrangement comprising a pair of crank shafts joined diametrically of each other to a medial crank arm, a disc-like crank arm secured to the outer end of each said crank shaft having an axle shaft extending outwardly therefrom co-axially of the axis of swing of said crank shaft, a wheel mounted on each said axle shaft and a one way clutch means between each said wheel and the disc-like crank arm adjacent thereto for drivingly connecting said wheels to said crank shaft arrangement, a pedal drivingly connected to each of said crank shafts and each comprising a bearinged trunnion journaled on its respective crank shaft, a leaf spring arm extending rearwardly from said trunnion and terminating in a downwardly extending trailing portion, and a caster wheel mounted on each said trailing portion for swivel action about an axis tilted forwardly relative to said walkomobile affording steerability of said walkomobile when the rider of the latter applies torsioning pressure to said pedals for twisting said leaf spring arms to tilt the trailing portions thereof.

9. A walkomobile comprising a wheeled fore gear including a crank shaft, a pair of trailing arms each having their fore ends journaled to said crank shaft, a tail wheel on the aft end of each said trailing arm for rollably supporting the aft end thereof, and a foot supporting platform on each of said trailing arm between the fore and aft ends of the latter.

10. A walkomobile comprising a fore gear having a wheel at each end of a pair of crank shafts joined diametrically of each other at a medial crank arm, a pair of leaf spring arms each having its fore end journaled to a respective one of said crank shafts, a downturned elbow-like trailing arm secured to the aft end each of said leaf spring arms, each of said trailing arms including a foot support platform having its aft end secured to said trailing arm and its fore end overlying the respective crank arm, and a tail wheel on the terminal end of each said trailing arms for rollably supporting the aft end of the same.

References Cited in the file of this patent

UNITED STATES PATENTS

| | | |
|---|---|---|
| 1,017,162 | Naumann | Feb. 13, 1912 |
| 1,465,435 | Higgins | Aug. 21, 1923 |
| 1,533,824 | Benjamin | Apr. 14, 1925 |
| 1,664,641 | Raasch | Apr. 3, 1928 |
| 2,165,996 | Chiles | July 11, 1939 |
| 2,416,471 | Chappedelaine | Feb. 25, 1947 |